United States Patent
Yuan et al.

(10) Patent No.: US 11,252,649 B2
(45) Date of Patent: Feb. 15, 2022

(54) SWITCHING METHOD AND APPARATUS

(71) Applicant: HUAWEI TECHNOLOGIES CO., LTD., Guangdong (CN)

(72) Inventors: Kai Yuan, Beijing (CN); Xiaoyan Duan, Shenzhen (CN); Bo Zhang, Beijing (CN); Feifei Sui, Beijing (CN); Zhenrong Wei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/967,253

(22) PCT Filed: Feb. 5, 2018

(86) PCT No.: PCT/CN2018/075311
§ 371 (c)(1),
(2) Date: Aug. 4, 2020

(87) PCT Pub. No.: WO2019/148500
PCT Pub. Date: Aug. 8, 2019

(65) Prior Publication Data
US 2020/0367151 A1 Nov. 19, 2020

(51) Int. Cl.
*H04W 48/00* (2009.01)
*H04W 76/16* (2018.01)
(Continued)

(52) U.S. Cl.
CPC ........... *H04W 48/17* (2013.01); *H04W 36/14* (2013.01); *H04W 48/16* (2013.01); *H04W 48/18* (2013.01);
(Continued)

(58) Field of Classification Search
CPC ..... H04W 48/17; H04W 76/16; H04W 36/14; H04W 48/16; H04W 48/18; H04W 88/06; H04W 88/16; H04W 48/00
See application file for complete search history.

(56) References Cited

U.S. PATENT DOCUMENTS

| 2011/0216743 A1 | 9/2011 | Bachmann et al. |
| 2014/0328177 A1 | 11/2014 | Zhao et al. |
(Continued)

FOREIGN PATENT DOCUMENTS

| CN | 101668280 A | 3/2010 |
| CN | 104618976 A | 5/2015 |
(Continued)

OTHER PUBLICATIONS

C1-180302 Huawei, HiSilicon,"QoS provision for interworking with 5GS", 3GPP TSG-CT WG1 Meeting #106, Gothenburg (Sweden), Jan. 22-26, 2018, total 8 pages.
(Continued)

*Primary Examiner* — Julio R Perez (57) ABSTRACT

A switching method and a terminal device, which relate to the communications field. The switching method comprises: establishing, by a terminal device, a first packet data network PDN connection in a long term evolution LTE access network; switching, by the terminal device, the first PDN connection from the LTE access network to a wireless local area network WLAN access network; establishing, by the terminal device, a second PDN connection in the LTE access network, so that the terminal device is in a registered state in the LTE network; and switching, by the terminal device, the first PDN connection or a third PDN connection established in the WLAN access network, to the LTE access network.

21 Claims, 5 Drawing Sheets

(51) Int. Cl.
   *H04W 36/14* (2009.01)
   *H04W 48/16* (2009.01)
   *H04W 48/18* (2009.01)
   *H04W 88/06* (2009.01)
   *H04W 88/16* (2009.01)

(52) U.S. Cl.
   CPC ........... *H04W 76/16* (2018.02); *H04W 88/06* (2013.01); *H04W 88/16* (2013.01)

(56) References Cited

U.S. PATENT DOCUMENTS

| | | |
|---|---|---|
| 2015/0092553 A1 | 4/2015 | Sirotkin et al. |
| 2015/0163811 A1 | 6/2015 | Konstantinou et al. |
| 2015/0245401 A1 | 8/2015 | Salkintzis |
| 2015/0282013 A1* | 10/2015 | Kim ................... H04W 36/0022 370/331 |
| 2016/0080981 A1 | 3/2016 | Wang et al. |
| 2016/0090981 A1 | 3/2016 | Ryan |
| 2016/0295482 A1* | 10/2016 | Belghoul ............... H04W 36/32 |
| 2017/0237783 A1* | 8/2017 | Yang ..................... H04W 36/08 370/331 |
| 2018/0191493 A1 | 7/2018 | Hu et al. |
| 2018/0199247 A1* | 7/2018 | Melander .......... H04W 36/0066 |
| 2019/0320322 A1* | 10/2019 | Jayawardene ........ H04L 47/821 |
| 2019/0320494 A1* | 10/2019 | Jayawardene ........ H04L 5/0041 |
| 2021/0105691 A1* | 4/2021 | Zhu .................... H04L 43/0829 |

FOREIGN PATENT DOCUMENTS

| | | |
|---|---|---|
| CN | 102972084 B | 9/2016 |
| CN | 106658622 A | 5/2017 |
| CN | 106797555 A | 5/2017 |
| CN | 107615825 A | 1/2018 |
| WO | 2012112571 A1 | 8/2012 |
| WO | 2017131808 A1 | 8/2017 |
| WO | 2017131965 A1 | 8/2017 |

OTHER PUBLICATIONS

Extended European Search Report issued in EP Application No. 18903769.0, dated Jan. 26, 2021, total 12 pages.

S2-150214, Alcatel-Lucent et al., "Enabling seamless handover with WLAN", SA WG2 Meeting #107, Jan. 26-30, 2015, Sorrento, Italy, total 5 pages.

Wang Qing, "IP Flow Mobility Trigger Mechanism in the Heterogeneous Wireless Networks", Master's Degree Thesis of Beijing University of Posts and Telecommunications, Mar. 2013, With an English Abstract, total 61 pages.

Office Action issued in CN 201880084466.0 dated Aug. 23, 2021, 9 pages.

* cited by examiner

SWITCHING METHOD AND APPARATUS

This application is the U.S. national phase of International Application No. PCT/CN2018/075311 filed 5 Feb. 2018, which designated the U.S., the entire contents of which is hereby incorporated by reference.

TECHNICAL FIELD

Embodiments of this application relate to the communications field, and in particular, to a switching method and an apparatus.

BACKGROUND

With development of communications technologies, wireless fidelity (Wi-Fi) has become a means of deep supplementary coverage of a mobile communications network deployed by an international operator. A terminal device may not only access an internet protocol (IP) multimedia subsystem (IMS) through a long term evolution (LTE) access network, to perform a voice over long term evolution (VoLTE) service, but may also access the IMS through a wireless local area network (WLAN) access network, to perform a voice over Wi-Fi (VoWiFi) service.

In a process in which the terminal device performs the VoLTE service or the VoWiFi service, the terminal device sometimes needs to be switched between the LTE access network and the WLAN access network due to factors such as signal strength. However, in a process of switching from the WLAN access network to the LTE access network, because the terminal device is implicitly detached from the LTE access network, a switching process is discontinuous, a delay is relatively long, and even a call drop occurs.

SUMMARY

Embodiments of this application provide a switching method and an apparatus, to resolve problems that a switching process is discontinuous, a delay is relatively long, and even a call drop occurs.

To achieve the foregoing objective, the following technical solutions are used in the embodiments of this application.

According to a first aspect of the embodiments of this application, a switching method is provided, and includes: establishing, by a terminal device, a first packet data network (or Public Data Network, PDN) connection in an LTE access network; switching, by the terminal device, the first PDN connection from the LTE access network to a WLAN access network; establishing, by the terminal device, a second PDN connection in the LTE access network, so that the terminal device is in a registered state in the LTE network; and switching, by the terminal device to the LTE access network, the first PDN connection or a third PDN connection established in the WLAN access network. According to the switching method provided in this embodiment of this application, after the terminal device switches the first PDN connection from the LTE access network to the WLAN access network, the terminal device pre-establishes the second PDN connection in the LTE access network. In a process in which the terminal device needs to switch, from the WLAN access network back to the LTE access network, the first PDN connection or the third PDN connection established in the WLAN access network, because the terminal device pre-establishes the second PDN connection in the LTE access network, the terminal device does not need to be registered with the LTE access network again. Therefore, a switching delay is effectively reduced, and occurrence of switching interruption is reduced.

With reference to the first aspect, in a possible implementation, when the terminal device switches the first PDN connection from the LTE access network to the WLAN access network, the terminal device does not establish any PDN connection in the LTE access network.

With reference to the first aspect or the foregoing possible implementation, in another possible implementation, the first PDN connection established by the terminal device in the LTE access network may be a connection switched from another access network to the LTE access network. For example, the terminal device establishes the first PDN connection in a first access network, and the terminal device switches the first PDN connection from the first access network to the LTE access network. The first access network is another access network different from the LTE access network.

With reference to the foregoing possible implementations, in another possible implementation, before the switching, by the terminal device, the first PDN connection from the first access network to the LTE access network, the method further includes: disabling, by the terminal device, a data service in the first access network.

With reference to the first aspect or the foregoing possible implementations, in another possible implementation, the first PDN connection is used for a voice service.

With reference to the foregoing possible implementations, in another possible implementation, the establishing, by the terminal device, a second PDN connection in the LTE access network includes: directly initiating, by the terminal device, establishment of the second PDN connection in the LTE access network after the terminal device switches the first PDN connection from the LTE access network to the WLAN access network; and after the terminal device switches the first PDN connection from the LTE access network to the WLAN access network, initiating, by the terminal device, a registration process in the LTE access network, and initiating establishment of the second PDN connection in the LTE access network after registration succeeds.

With reference to the first aspect, in another possible implementation, the first PDN connection is a PDN connection corresponding to an IMS access point name (IMS APN), and the second PDN connection is a PDN connection corresponding to an internet APN; or the first PDN connection is a PDN connection corresponding to an internet APN, and the second PDN connection is a PDN connection corresponding to an IMS APN.

According to a second aspect of the embodiments of this application, a switching method is provided, and includes: establishing, by a terminal device, a first PDN connection in an LTE access network; establishing, by the terminal device, a second PDN connection in the LTE access network, so that the terminal device is in a registered state in the LTE network; switching, by the terminal device, the first PDN connection from the LTE access network to a WLAN access network; and switching, by the terminal device to the LTE access network, the first PDN connection or a third PDN connection established in the WLAN access network. According to the switching method provided in this embodiment of this application, after the terminal device switches the first PDN connection from a first access network to the LTE access network, the terminal device pre-establishes the second PDN connection in the LTE access network. In a process in which the terminal device needs to switch, from the WLAN access network back to the LTE access network, the first PDN connection or the third PDN connection established in the WLAN access network, because the terminal device pre-establishes the second PDN connection in the LTE access network, the terminal device does not need to be registered with the LTE access network again. Therefore, a switching delay is effectively reduced, and occurrence of switching interruption is reduced.

With reference to the second aspect, in a possible implementation, before the establishing, by the terminal device, a second PDN connection in the LTE access network, the terminal device does not establish any PDN connection other than the first PDN connection in the LTE access network.

With reference to the second aspect or the foregoing possible implementation, in another possible implementation, the first PDN connection established by the terminal device in the LTE access network may be a connection switched from another access network to the LTE access network. For example, the terminal device establishes the first PDN connection in a first access network, and the terminal device switches the first PDN connection from the first access network to the LTE access network. The first access network is another access network different from the LTE access network.

With reference to the foregoing possible implementations, in another possible implementation, before the terminal device switches the first PDN connection from the first access network to the LTE access network, the method further includes: disabling, by the terminal device, a data service in the first access network.

With reference to the second aspect or the foregoing possible implementations, in another possible implementation, the first PDN connection is used for a voice service.

With reference to the second aspect, in another possible implementation, the first PDN connection is a PDN connection corresponding to an internet protocol multimedia subsystem access point name IMS APN, and the second PDN connection is a PDN connection corresponding to an internet access point name internet APN; or the first PDN connection is a PDN connection corresponding to an internet APN, and the second PDN connection is a PDN connection corresponding to an IMS APN.

According to a third aspect of the embodiments of this application, a terminal device is provided, and includes: an establishment unit, configured to establish a first packet data network PDN connection in a long term evolution LTE access network; and a switching unit, configured to switch the first PDN connection from the LTE access network to a wireless local area network WLAN access network, where the establishment unit is further configured to establish a second PDN connection in the LTE access network, so that the terminal device is in a registered state in the LTE network; and the switching unit is further configured to switch, to the LTE access network, the first PDN connection or a third PDN connection established in the WLAN access network.

According to a fourth aspect of the embodiments of this application, a terminal device is provided, and includes: an establishment unit, configured to establish a first PDN connection in a first access network; a switching unit, configured to switch the first PDN connection from the first access network to a long term evolution LTE access network, where the first access network is another access network different from the LTE access network, where the establishment unit is further configured to establish a second PDN connection in the LTE access network, so that the terminal device is in a registered state in the LTE network; the switching unit is further configured to switch the first PDN connection from the LTE access network to a wireless local area network WLAN access network; and the switching unit is further configured to switch, to the LTE access network, the first PDN connection or a third PDN connection established in the WLAN access network.

It should be noted that the function modules in the third aspect and the fourth aspect may be implemented by hardware, or may be implemented by hardware executing corresponding software. The hardware or software includes one or more modules corresponding to the foregoing functions. For example, a processor is configured to complete functions of the switching unit and the establishment unit, and a memory is configured to process a program instruction of the switching method in the embodiments of this application by the processor. The processor and the memory are connected and implement mutual communication by using a bus. For details, refer to a function of behavior of the terminal device in the switching methods provided in the first aspect and the second aspect.

According to a fifth aspect of the embodiments of this application, a terminal device is provided, and includes at least one processor, a memory, a communications interface, and a communications bus. The at least one processor is connected to the memory and the communications interface by using the communications bus. The memory is configured to store a computer-executable instruction. When the processor runs, the processor executes the computer-executable instruction stored in the memory, so that the terminal device performs the method in any one of the foregoing aspects.

According to a sixth aspect of the embodiments of this application, a computer storage medium is provided, and is configured to store a computer software instruction used by the foregoing terminal device. The computer software instruction includes a program designed to perform the foregoing switching methods.

According to a seventh aspect of the embodiments of this application, a computer program product including an instruction is provided. When the computer program product is run on a terminal device, the terminal device is enabled to perform the method in any of the foregoing aspects.

According to an eighth aspect of the embodiments of this application, a device is provided. The device exists in a product form of a chip. A structure of the device includes a processor and a memory. The memory is configured to be coupled to the processor, and is configured to store a program instruction and data of the device. The processor is configured to execute the program instruction stored in the memory, so that the device performs the method in any one of the foregoing aspects.

In addition, for technical effects brought by any design manner of the third to the eighth aspects, refer to technical effects brought by different design manners of the first aspect and the second aspect. Details are not described herein.

In the embodiments of this application, a name of the terminal device constitutes no limitation on the device. In an actual implementation, the devices may have other names. Provided that functions of each device are similar to those in the embodiments of this application and fall within the scope of the claims of this application and their equivalent technologies.

These aspects or other aspects in the embodiments of this application are clearer and more comprehensible in descriptions of the following embodiments.

DESCRIPTION OF EMBODIMENTS

In the prior art, if a terminal device does not establish any PDN connection in an LTE access network, when the terminal device needs to switch from a WLAN access network to the LTE access network, the terminal device first needs to be registered with the LTE access network, and then can perform a process of switching from the WLAN access network to the LTE access network. Therefore, in the process in which the terminal device switches from the WLAN access network to the LTE access network, a delay is relatively long, and even a call drop occurs.

To resolve problems that a switching process is discontinuous, a delay is relatively long, and even a call drop occurs, the embodiments of this application provide a switching method. A basic principle of the switching method is as follows: A terminal device establishes a first PDN connection in an LTE access network; the terminal device switches the first PDN connection from the LTE access network to a WLAN access network; the terminal device establishes a second PDN connection in the LTE access network, so that the terminal device is in a registered state in the LTE network; and the terminal device switches, to the LTE access network, the first PDN connection or a third PDN connection established in the WLAN access network. According to the switching method provided in the embodiments of this application, after the terminal device switches the first PDN connection from the LTE access network to the WLAN access network, the terminal device pre-establishes the second PDN connection in the LTE access network. In a process in which the terminal device needs to switch, from the WLAN access network back to the LTE access network, the first PDN connection or the third PDN connection established in the WLAN access network, because the terminal device pre-establishes the second PDN connection in the LTE access network, the terminal device does not need to be registered with the LTE access network again. Therefore, a switching delay is effectively reduced, and occurrence of switching interruption is reduced.

The following describes implementations of the embodiments of this application in detail with reference to accompanying drawings.

Figure 1:
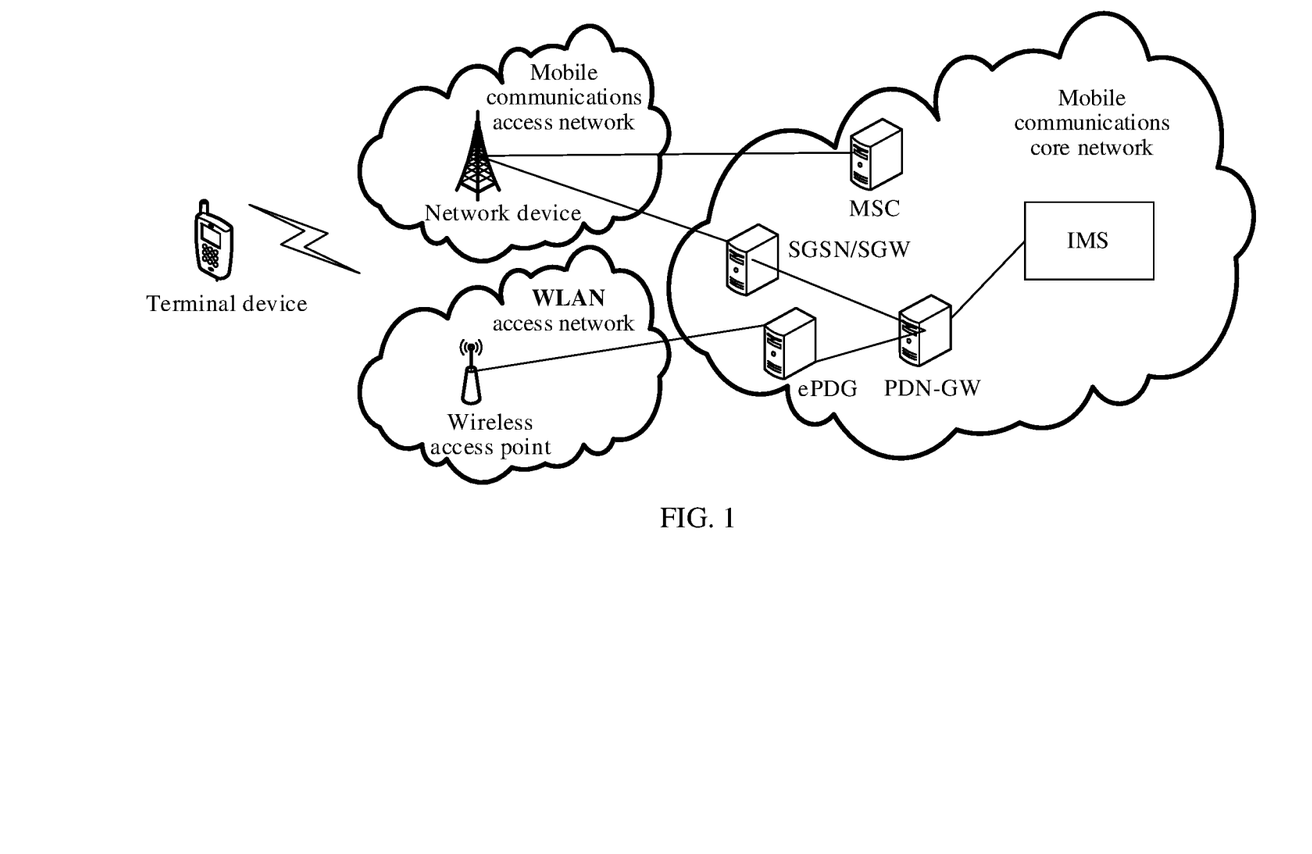
FIG. 1 is a simplified schematic diagram of a communications system to which the embodiments of this application are applied according to an embodiment of this application.

FIG. 1 is a simplified schematic diagram of a communications system to which an embodiment of this application may be applied. As shown in FIG. 1, the communications system includes a terminal device, a mobile communications access network, a WLAN access network, and a mobile communications core network. The terminal device is wirelessly connected to each of the mobile communications access network and the WLAN access network. The mobile communications access network and the WLAN access network each are wiredly connected to the mobile communications core network. The terminal device may access the mobile communications access network by using a wireless communications technology, to communicate with the mobile communications core network. The wireless communications technology may be a 2nd generation (2G) wireless communications technology, a 3rd generation (3G) wireless communications technology, a 4th generation (4G) wireless communications technology, or a 5th generation (5G) mobile communications technology. The mobile communications access network may be an access network of a 2G mobile communications system, an access network of a 3G mobile communications system, an access network of a 4G mobile communications system, or an access network of a 5G mobile communications system. Similarly, the mobile communications core network may be a core network of a 2G mobile communications system, a core network of a 3G mobile communications system, a core network of a 4G mobile communications system, or a core network of a 5G mobile communications system. The terminal device may access the WLAN access network by using a wireless local area network technology or a wireless mobile network convergence technology, to communicate with the mobile communications core network.

The mobile communications core network may include a mobile switching center (MSC). The MSC is one of core network elements in the 2G mobile communications system. The MSC provides a call switching service and call control between a telephone and a data system. The MSC switches all calls between a mobile phone and each of a public switched telephone network (PSTN) and another mobile phone. In addition, the MSC is also an interface device between the mobile network and a fixed network such as the PSTN or an integrated services digital network (ISDN). Then, an equipment supplier divides the MSC into an MSC-S and a media gateway (MGW). The MGW is configured to: carry traffic, and mainly complete functions such as voice coding, data exchange, echo suppression, lawful interception, and multiparty call. The MGW is controlled by the MSC-S.

A serving general packet radio service (GPRS) support node (SGSN). The SGSN is an important part of a packet domain device in a core network of a mobile communications network. The SGSN mainly completes functions such as routing and forwarding of a data packet, mobility management, session management, logical link management, authentication, encryption, and service detail record generation and output.

A serving gateway (SGW) is an important network element in an evolved packet core (EPC) network in a 4G mobile communications network. The EPC network is an evolved version of a PS domain of an original 3G core network. A function and a role of the SGW are the same as those of a user plane of an SGSN in the original 3G core network. In other words, in a new EPC network, a control plane function and a media plane function are separated more thoroughly.

The packet data gateway (PDN-GW) is responsible for functions such as mobility management, security, and access control in a packet domain, and sends and receives mobile packet data between a mobile station and the GGSN.

A secure tunnel is established between an evolved packet data gateway (ePDG) and the terminal device, to ensure that the terminal device is securely connected to the mobile communications core network through an untrusted non-3GPP access network and performs data transmission. The IMS is used to provide a voice service for a user who is registered with the LTE network.

The mobile communications access network includes a network device. The network device may be a base station (BS), a base station controller, or the like in wireless communication. Alternatively, the network device may be referred to as a transceiver station, a relay station, a transmit and receive port (TRP), or the like. Specifically, the network device is an apparatus that is deployed in a radio access network and that is configured to provide a wireless communication function for the terminal device. Main functions of the network device include one or more of the following functions: radio resource management, IP header compression, user data flow encryption, and selection of a mobility management entity (MME) when user equipment is attached, routing of user plane data to the SGW, organization and sending of a paging message, organization and sending of a broadcast message, measurement for mobility or scheduling and configuration of a measurement report, and the like. In a system in which different radio access technologies are used, a device having a function of the network device may have different names. For example, the device is referred to as a NodeB in a 3G system; the device is referred to as an evolved NodeB (eNB or eNodeB) in an LTE system; the device is referred to as a gNB, or the like in a 5G system; and the device is referred to as an access point in a wireless local access system. For example, the WLAN access network in this embodiment of this application includes an access point. As evolution of communications technologies, a name of the network device may change. In addition, in another possible case, the network device may be another apparatus that provides a wireless communication function for the terminal device. In this embodiment of this application, the terminal device interacts with the device in the mobile communications core network through the network device.

It should be noted that the communications system described herein in this embodiment of this application is merely an example description. In actual application, the mobile communications access network, the WLAN access network, and the mobile communications core network may further include another device based on a requirement. Details are not described herein in this embodiment of this application.

The terminal device may be a wireless terminal. The wireless terminal may be a device that provides a user with voice and/or data connectivity, a handheld device with a wireless connection function, or another processing device connected to a wireless modem. The wireless terminal may communicate with one or more core networks or the internet through a radio access network (RAN). The wireless terminal may be a mobile terminal, for example, a mobile phone (or referred to as a "cellular" phone), a computer, and a data card. For example, the wireless terminal may be a portable, pocket-sized, handheld, or computer built-in mobile apparatus, or an in-vehicle mobile apparatus, which exchanges voice and/or data with the radio access network. For example, the wireless terminal may be a device such as a personal communications service (PCS) phone, a cordless telephone set, a session initiation protocol phone, a wireless local loop (WLL) station, or a personal digital assistant ( ). The wireless terminal may also be referred to as a system, a subscriber unit, a subscriber station, a mobile station, a mobile console, a remote station, an access point, a remote terminal, or an access terminal, a user terminal, a user agent, a subscriber station (SS), customer premises equipment (CPE), user equipment (UE), or the like. In an embodiment, the terminal device shown in FIG. 1 may be a mobile phone.

Figure 2:
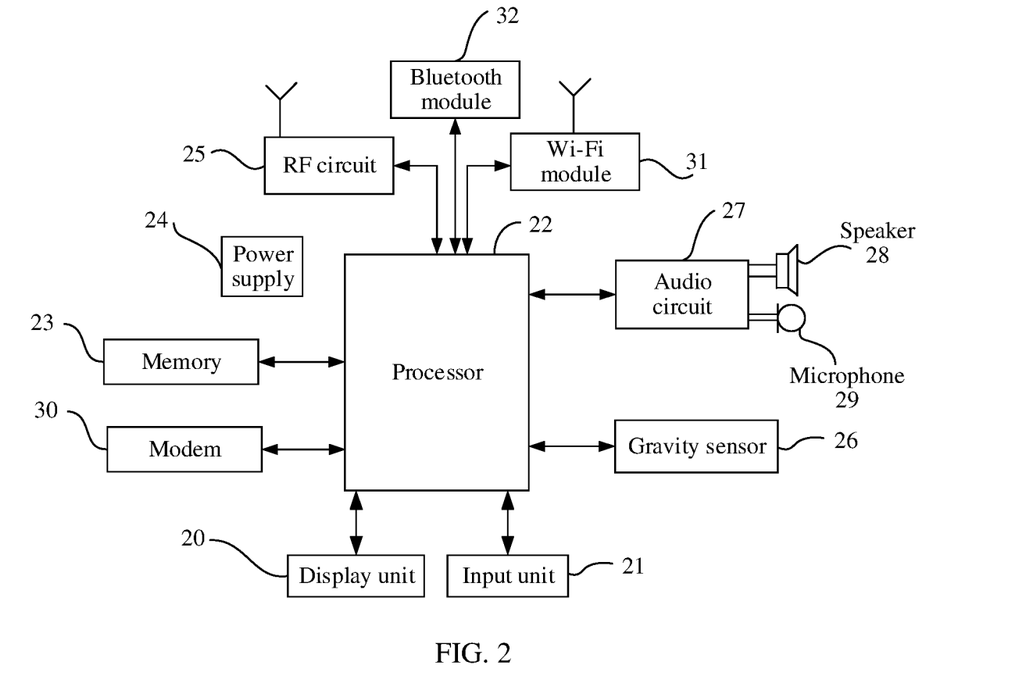
FIG. 2 is a schematic composition diagram of a mobile phone according to an embodiment of this application.

FIG. 2 is a schematic composition diagram of a mobile phone according to an embodiment of this application. As shown in FIG. 2, the mobile phone may include components such as a display unit 20, an input unit 21, a processor 22, a memory 23, a power supply 24, a radio frequency (RF) circuit 25, a gravity sensor 26, an audio circuit 27, a speaker 28, a microphone 29, a modem 30, a Wi-Fi module 31, a Bluetooth module 32, and the like. These components may be connected by using a bus, or may be directly connected. A person skilled in the art may understand that a structure of the mobile phone shown in FIG. 2 constitutes no limitation on the mobile phone, and the mobile phone may include more components than those shown in the figure, or combine some components, or have different component deployments.

The display unit 20 is operably connected to the processor 22, and is configured to receive and display a processing result returned by the processor 22. For example, the display unit 20 may be configured to display an image captured by using a camera, and various menus of the mobile phone. A graphical user interface (GUI) is usually configured in the display unit 20, and the GUI is configured to provide an easy-to-use interface between a user and an operating system running on the mobile phone.

The input unit 21 may be a single-point or multipoint input unit. The input unit 21 is operably connected to the processor 22, and is configured to receive an input operation of the user. The input unit 21 may be a touchpad or a touchscreen that is disposed above or in front of the display unit 20. The touchpad or the touchscreen may collect a touch operation performed on or near the touchpad or the touchscreen by the user (for example, an operation performed on the touchscreen or near the touchscreen by the user through any proper object or accessory such as a finger or a stylus), and drive a corresponding connection apparatus based on a preset program. For example, the touchpad or the touchscreen may be implemented based on a sensing technology such as capacitance sensing, resistance sensing, surface acoustic wave sensing, pressure sensing, or light sensing. The touchpad or the touchscreen may be integrated with the display unit 20, or may be an independent component.

As a control center of the mobile phone, the processor 22 connects various parts of the entire mobile phone by using various interfaces and lines, and performs various functions of the mobile phone and processes data by running or executing a software program and/or a module stored in the memory 23 and by invoking data stored in the memory 23, to perform overall monitoring on the mobile phone. In a specific implementation, in an embodiment, the processor 22 may include one or more processing units, and an application processor and a modem processor may be integrated into the processor 22. The application processor mainly processes an operating system, a user interface, an application program, and the like, and the modem processor mainly processes wireless communication. It can be understood that the foregoing modem processor may not be integrated into the processor 22. In this embodiment of this application, the processor 22 is configured to: establish, by a terminal device, a first packet data network PDN connection in a long term evolution LTE access network; switch, by the terminal device, the first PDN connection from the LTE access network to a wireless local area network WLAN access network; establish, by the terminal device, a second PDN connection in the LTE access network, so that the terminal device is in a registered state in the LTE network; and switch, by the terminal device to the LTE access network, the first PDN connection or a third PDN connection established in the WLAN access network.

The memory 23 may be configured to store data, a software program, and a module, and may be a volatile memory, for example, a random access memory (RAM); or a nonvolatile memory, for example, a read-only memory (ROM), a flash memory, a hard disk (HDD), or a solid-state drive (SSD); or a combination of the foregoing types of memories; or may be a removable storage medium, for example, a secure digital (SD) memory card. Specifically, the memory 23 may store program code, and the program code is used to enable the processor 22 to perform, by executing the program code, the switching method provided in the embodiments of this application.

The power supply 24 may be a battery, and is logically connected to the processor 22 by using a power supply management system, to implement functions such as charging management, discharging management, and power consumption management by using the power supply management system.

The RF circuit 25 may be configured to receive and send a signal in an information receiving and sending process or a call process. Particularly, the RF circuit 25 sends received information to the processor 22 for processing, and sends a signal generated by the processor 22. Usually, the RF circuit includes but is not limited to an antenna, at least one amplifier, a transceiver, a coupler, a low noise amplifier (LNA), a duplexer, and the like. In addition, the RF circuit 25 may also communicate with a network and another device through wireless communication. In this embodiment of this application, the RF circuit 25 can send, to the LTE access network, a switching message or a message for establishing a PDN connection.

The gravity sensor 26 may detect acceleration values of the mobile phone in all directions (usually, three axes), may detect a gravity value and direction when the mobile phone is static, and may be used in an application for identifying a mobile phone posture (such as landscape-to-portrait switching, a related game, and magnetometer posture calibration), a function related to vibration identification (such as a pedometer or a knock), or the like. It should be noted that the mobile phone may further include other sensors such as a pressure sensor, an optical sensor, a gyroscope, a barometer, a hygrometer, a thermometer, and an infrared sensor. Details are not described herein.

The audio circuit 27, the speaker 28, and the microphone 29 may provide an audio interface between the user and the mobile phone. The audio circuit 27 may transmit an electrical signal converted from received audio data to the speaker 28, and the speaker 28 converts the electrical signal into a sound signal for outputting. In addition, the microphone 29 converts a collected sound signal into an electrical signal, and the audio circuit 27 converts the electrical signal into audio data after receiving the electrical signal, and then outputs the audio data to the RF circuit 25 to send the audio data to, for example, another mobile phone, or outputs the audio data to the processor 22 for further processing.

The Wi-Fi module 31 may be a module including a Wi-Fi chip and a Wi-Fi chip driver, and the Wi-Fi chip is capable of running a wireless internet standard protocol. In addition, an operating system runs above the foregoing components. An application such as WeChat, QQ, or Weibo may be installed and run in the operating system. The mobile phone may further include components such as a camera, a Bluetooth module, and the like, which are not shown though. The Bluetooth module is a printed circuit board assembly (PCBA) integrating with a Bluetooth function, and is configured for short-range wireless communication.

In addition, in the embodiments of this application, the terms such as "for example", "such as" are used to represent giving an example, an illustration, or a description. Any embodiment or design scheme described as an "example" or "for example" in the embodiments of this application should not be explained as being more preferred or having more advantages than another embodiment or design scheme. Exactly, use of the words such as "example" or "for example" is intended to present a concept in a specific manner.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

It should be noted that the "connection" mentioned above means that mutual communication may be performed, and specifically, the connection may be a connection in a wired manner or may be a connection in a wireless manner. This is not specifically limited in this embodiment of this application. Devices connected to each other may be directly connected, or may be connected by using another device. This is not specifically limited in this embodiment of this application.

The switching method provided in the embodiments of this application is described below in detail by using an example in which the mobile communications access network is an LTE access network.

Figure 3:
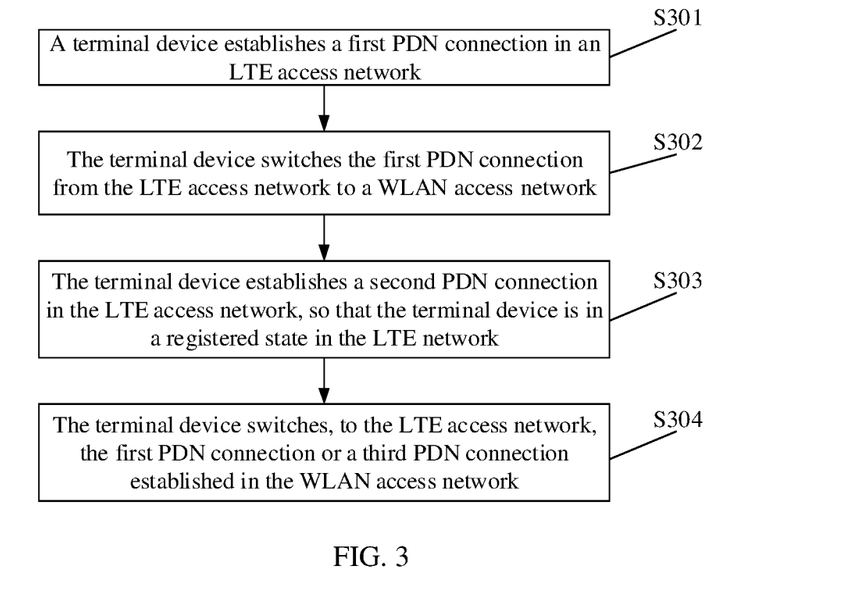
FIG. 3 is a flowchart of a switching method according to an embodiment of this application.

FIG. 3 is a flowchart of a switching method according to an embodiment of this application. As shown in FIG. 3, the method may include the following steps.

S301: A terminal device establishes a first PDN connection in an LTE access network.

A PDN is a wide area network established by a telecom operator, and is used to provide a high-quality data transmission service for a user. A PDN connection is an IP connection between the terminal device and an evolved packet core (EPC) network. The terminal device initiates a PDN connection request to a network to establish a new PDN connection. This triggers the network to initiate a default bearer establishment process. The network may initiate a dedicated bearer establishment process for a service with specific quality of service (QoS) (that is, transmitting user data of this service type), for example, a voice service whose quality of service class identifier is 1. It may be understood that the PDN connection includes a default bearer, and may further include a dedicated bearer.

Figure 4:
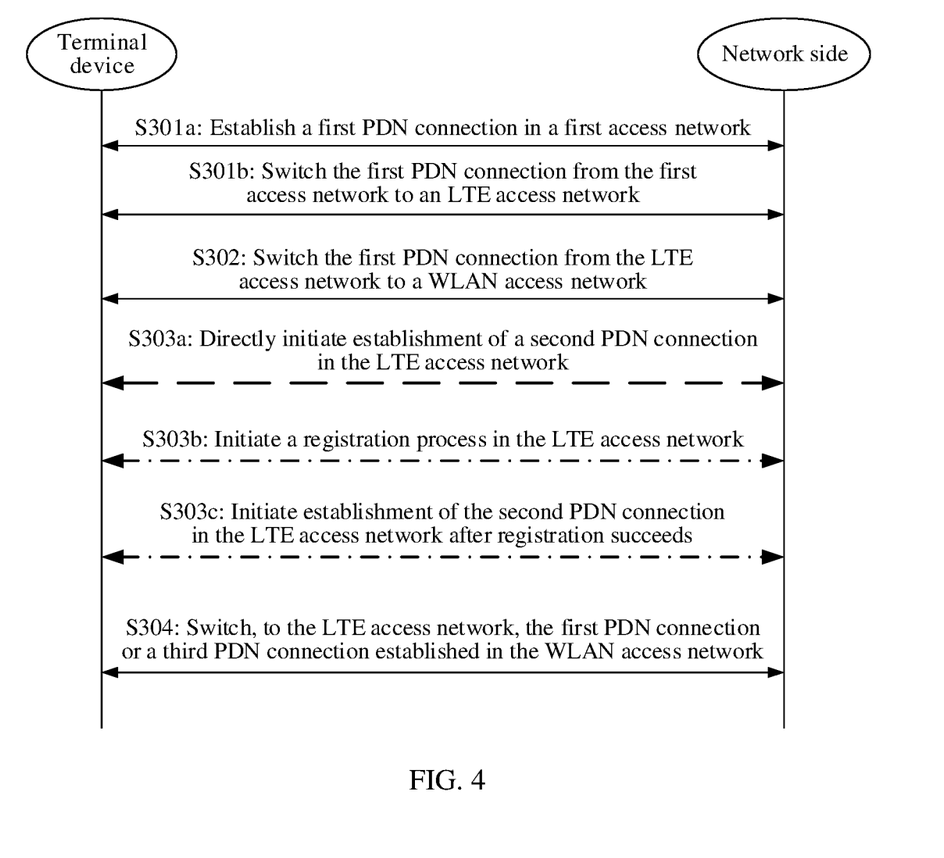
FIG. 4 is a flowchart of another switching method according to an embodiment of this application.

It should be noted that in a possible implementation, the first PDN connection established by the terminal device in the LTE access network is a first PDN connection switched from a first access network to the LTE access network. For example, FIG. 4 shows a detailed process in which the terminal device establishes the first PDN connection in the LTE access network.

S301a: The terminal device establishes the first PDN connection in the first access network.

The first access network is another access network different from the LTE access network, for example, a wideband code division multiple access (WCDMA) access network.

S301b: The terminal device switches the first PDN connection from the first access network to the LTE access network.

The terminal device switches the first PDN connection from the first access network to the LTE access network, so that the terminal device establishes the first PDN connection in the LTE access network. For example, the terminal device disables a data service in the first access network, and the first PDN connection is used for a voice service. Because signal strength of the terminal device in the first access network is relatively weak, the first access network cannot provide a relatively high-quality voice service for the terminal device. However, in this case, the LTE access network has relatively strong signal strength, and may provide a relatively high-quality voice service for the terminal device. Therefore, the terminal device switches the first PDN connection from the first access network to the LTE access network.

In another possible implementation, the first PDN connection established by the terminal device in the LTE access network may be a PDN connection newly established by the terminal device in the LTE access network.

S302: The terminal device switches the first PDN connection from the LTE access network to a WLAN access network.

In the prior art, the terminal device may access a mobile communications core network through the LTE access network or the WLAN access network. For example, when the terminal device accesses the mobile communications core network through the LTE access network to perform a data service or a voice service, because signal strength of the terminal device in the LTE access network is relatively weak, the LTE access network cannot provide a relatively high-quality voice service for the terminal device, but in this case, the WLAN access network has relatively strong signal strength, and may provide a relatively high-quality voice service for the terminal device, the terminal device may switch the first PDN connection from the LTE access network to the WLAN access network.

It should be noted that the first PDN connection is used to carry the voice service of the terminal device, that is, is used to transmit voice service data, and the first PDN connection is also switched from the first access network different from the LTE access network to the LTE access network. It may be understood that in the LTE network, there is no any PDN connection between the terminal device and the LTE access network other than the first PDN connection used to carry the voice service. Therefore, after the first PDN connection is switched from the LTE access network to the WLAN access network, there is no any PDN connection between the terminal device and the LTE access network.

In another scenario, the terminal device is directly registered with a mobile communications network, establishes the first PDN connection in the LTE access network, and initiates the voice service in the mobile communications network. In this case, the first PDN connection includes both a default bearer and a dedicated bearer used to carry the voice service (that is, used to transmit user data of the voice service). Due to a factor such as signal strength, the terminal device switches the first PDN connection from the LTE access network to the WLAN access network. However, the terminal device has no service interaction in the mobile communications network for a long time, and a network side considers that the terminal device currently has no voice service bearer, and deactivates a default data service bearer. In this case, the terminal device does not have any PDN connection in the LTE network, and the LTE network implicitly detaches (implicit detach) the terminal device.

S303: The terminal device establishes a second PDN connection in the LTE access network, so that the terminal device is in a registered state in the LTE network.

After the terminal device switches the first PDN connection from the LTE access network to the WLAN access network, the terminal device does not establish any PDN connection in the LTE access network. In this case, the terminal device establishes the second PDN connection in the LTE access network, so that the terminal device is in the registered state in the LTE network. The second PDN connection may be a default data service bearer.

As shown in FIG. 4, the terminal device may establish the second PDN connection in the LTE access network in the following possible implementations.

S303a: The terminal device directly initiates establishment of the second PDN connection in the LTE access network.

An alternative is as follows.

S303b: The terminal device initiates a registration process in the LTE access network.

S303c: The terminal device initiates establishment of the second PDN connection in the LTE access network after registration succeeds.

It should be noted that the first PDN connection is a PDN connection corresponding to an IMS APN, and the second PDN connection is a PDN connection corresponding to an internet APN. Optionally, the first PDN connection is a PDN connection corresponding to an internet APN, and the second PDN connection is a PDN connection corresponding to an IMS APN.

S304: The terminal device switches, to the LTE access network, the first PDN connection or a third PDN connection established in the WLAN access network.

If a voice service of the terminal device in the WLAN access network is the same as a voice service (or referred to as a voice session or a voice call) switched from the LTE access network to the WLAN access network, in a process in which the terminal device performs the voice service in the WLAN access network, due to the factor such as the signal strength, the terminal device may need to switch the first PDN connection from the WLAN access network to the LTE access network. In S303, the terminal device has established the second PDN connection in the LTE access network, and the terminal device is (remains) in the registered state in the LTE network. Therefore, the terminal device can perform a PDN connection establishment procedure in the LTE access network to switch the first PDN connection in the WLAN access network to the LTE access network, without a need to register the terminal device with the LTE network again. In the PDN connection establishment procedure, the terminal device sends a PDN connection request to the mobile communications core network through the LTE access network. The PDN connection request carries an indication that a request type is handover (handover), to switch the first PDN connection to the LTE access network.

If the terminal device initiates a new service (which may be a voice service or another service) in the WLAN access network, and establishes a new PDN connection, namely, a third PDN connection for the service, in a process in which the terminal device performs the service in the WLAN access network, due to the factor such as the signal strength, the terminal device may need to switch the third PDN connection from the WLAN access network to the LTE access network. In S303, the terminal device has established the second PDN connection in the LTE access network, and the terminal device is in the registered state in the LTE network. Therefore, the terminal device can perform a PDN connection establishment procedure in the LTE access network to switch the third PDN connection in the WLAN access network to the LTE access network, without a need to register the terminal device with the LTE network again. In the PDN connection establishment procedure, the terminal device sends a PDN connection request to the mobile communications core network through the LTE access network. The PDN connection request carries an indication that a request type is switching (handover), to switch the third PDN connection to the LTE access network.

According to the switching method provided in this embodiment of this application, after the terminal device switches the first PDN connection from the LTE access network to the WLAN access network, the terminal device pre-establishes the second PDN connection in the LTE access network. In a process in which the terminal device needs to switch, from the WLAN access network back to the LTE access network, the first PDN connection or the third PDN connection established in the WLAN access network, because the terminal device pre-establishes the second PDN connection in the LTE access network, the terminal device does not need to be registered with the LTE access network again. Therefore, a switching delay is effectively reduced, and occurrence of switching interruption is reduced.

It should be noted that for the PDN connection establishment procedure, a switching process between the LTE access network and the WLAN access network, and a registration process in this embodiment of this application, refer to a detailed procedure in the prior art. Details are not described herein in this embodiment of this application.

Figure 5:
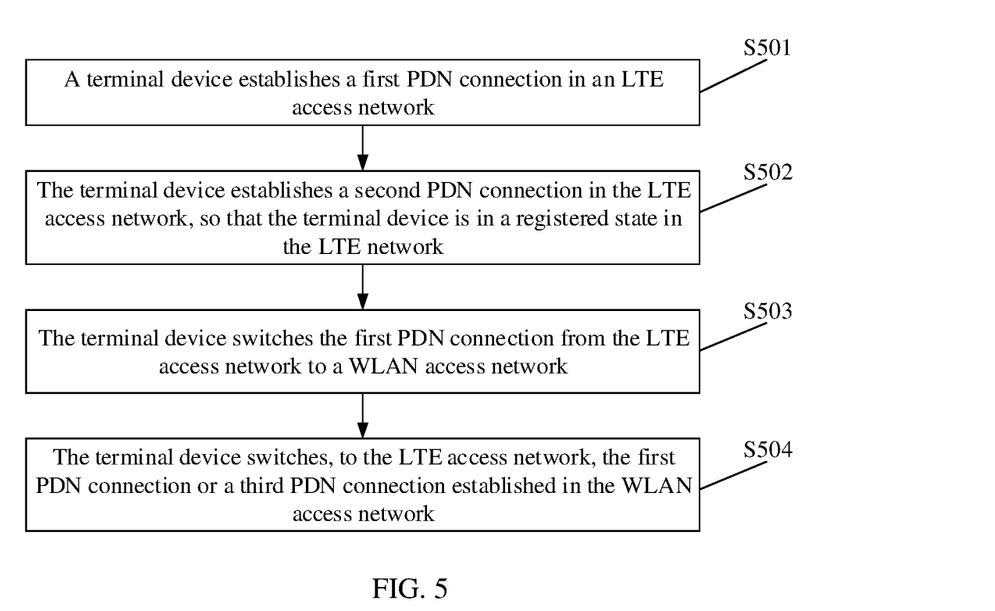
FIG. 5 is a flowchart of still another switching method according to an embodiment of this application.

FIG. 5 is a flowchart of a switching method according to an embodiment of this application. As shown in FIG. 5, the method may include the following steps.

S501: A terminal device establishes a first PDN connection in an LTE access network.

Figure 6:
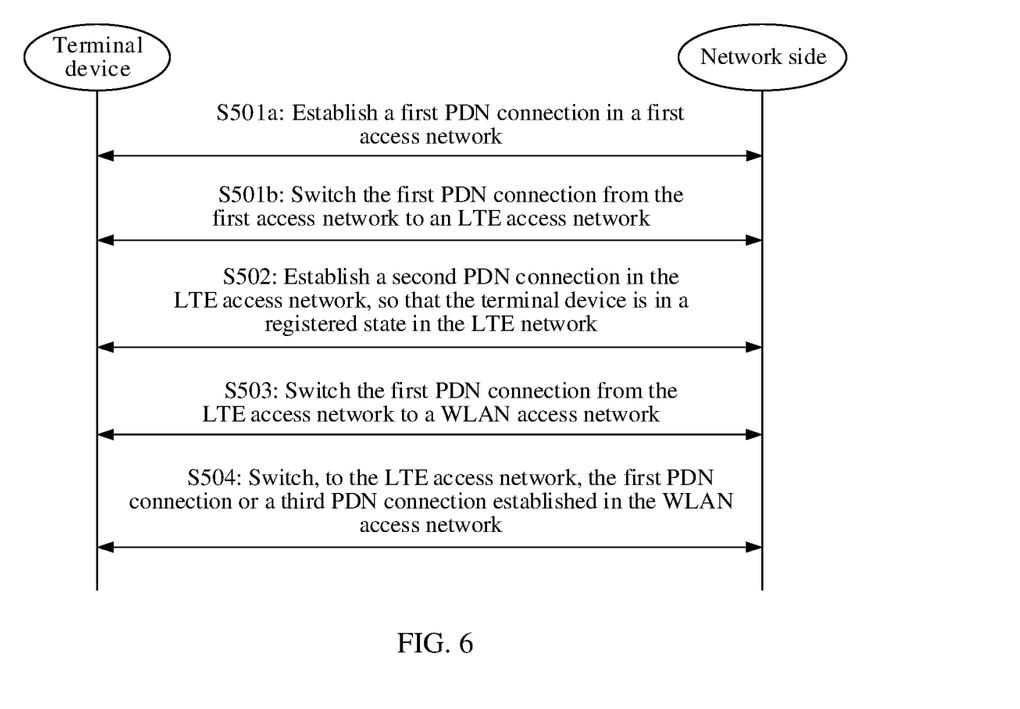
FIG. 6 is a flowchart of yet another switching method according to an embodiment of this application.

It should be noted that in a possible implementation, the first PDN connection established by the terminal device in the LTE access network may be a first PDN connection switched from a first access network to the LTE access network. FIG. 6 shows a detailed process in which the terminal device establishes the first PDN connection in the LTE access network.

S501a: The terminal device establishes the first PDN connection in the first access network.

The first access network is another access network different from the LTE access network, for example, a WCDMA access network.

S501b: The terminal device switches the first PDN connection from the first access network to the LTE access network.

The terminal device switches the first PDN connection from the first access network to the LTE access network, so that the terminal device establishes the first PDN connection in the LTE access network. For example, the terminal device disables a data service in the first access network, and the first PDN connection is used for a voice service. Because signal strength of the terminal device in the first access network is relatively weak, the first access network cannot provide a relatively high-quality voice service for the terminal device. However, in this case, the LTE access network has relatively strong signal strength, and may provide a relatively high-quality voice service for the terminal device. The terminal device switches the first PDN connection from the first access network to the LTE access network.

In another possible implementation, the first PDN connection established by the terminal device in the LTE access network may be a PDN connection newly established by the terminal device in the LTE access network.

S502: The terminal device establishes a second PDN connection in the LTE access network, so that the terminal device is in a registered state in the LTE network.

It should be noted that the first PDN connection is used to carry the voice service of the terminal device, that is, is used to transmit voice service data, and the first PDN connection is also switched from the first access network different from the LTE access network to the LTE access network. It may be understood that in the LTE network, there is no PDN connection between the terminal device and the LTE network other than the first PDN connection used to carry the voice service. Therefore, after the first PDN connection is switched from the LTE access network to the WLAN access network, there is no any PDN connection between the terminal device and the LTE access network. The terminal device pre-establishes the second PDN connection in the LTE access network, so that the terminal device is (remains) in the registered state in the LTE network.

If the first PDN connection established by the terminal device in the LTE access network may be a PDN connection newly established by the terminal device in the LTE access network. If the newly established first PDN connection is a PDN connection corresponding to an IMS APN, the second PDN connection is a PDN connection corresponding to an internet APN. Alternatively, the newly established first PDN connection is a PDN connection corresponding to an internet APN, and the second PDN connection is a PDN connection corresponding to an IMS APN.

S503: The terminal device switches the first PDN connection from the LTE access network to the WLAN access network.

In a process in which the terminal device performs the voice service in the LTE access network, due to a factor such as signal strength, the terminal device switches the first PDN connection from the LTE access network to the WLAN access network.

S504: The terminal device switches, to the LTE access network, the first PDN connection or a third PDN connection established in the WLAN access network.

If a voice service of the terminal device in the WLAN access network is the same as a voice service (or referred to as a voice session or a voice call) switched from the LTE access network to the WLAN access network, in a process in which the terminal device performs the voice service in the WLAN access network, due to the factor such as the signal strength, the terminal device may need to switch the first PDN connection from the WLAN access network to the LTE access network. In S502, the terminal device has established the second PDN connection in the LTE access network, the terminal device is (remains) in the registered state in the LTE network. Therefore, the terminal device can perform a PDN connection establishment procedure in the LTE access network to switch the first PDN connection in the WLAN access network to the LTE access network, without a need to register the terminal device with the LTE network. In the PDN connection establishment procedure, the terminal device sends a PDN connection request to a mobile communications core network through the LTE access network. The PDN connection request carries an indication that a request type is switching (handover), to switch the first PDN connection to the LTE access network.

If the terminal device initiates a new service (which may be a voice service or another service) in the WLAN access network, and establishes a new PDN connection, namely, a third PDN connection for the service, in a process in which the terminal device performs the service in the WLAN access network, due to the factor such as the signal strength, the terminal device may need to switch the third PDN connection from the WLAN access network to the LTE access network. In S502, the terminal device has established the second PDN connection in the LTE access network, the terminal device is (remains) in the registered state in the LTE network. Therefore, the terminal device can perform a PDN connection establishment procedure in the LTE access network to switch the third PDN connection in the WLAN access network to the LTE access network, without a need to register the terminal device with the LTE network. In the PDN connection establishment procedure, the terminal device sends a PDN connection request to a mobile communications core network through the LTE access network. The PDN connection request carries an indication that a request type is switching (handover), to switch the third PDN connection to the LTE access network.

According to the switching method provided in this embodiment of this application, after the terminal device switches the first PDN connection from a first access network to the LTE access network, the terminal device pre-establishes the second PDN connection in the LTE access network. In a process in which the terminal device needs to switch, from the WLAN access network back to the LTE access network, the first PDN connection or the third PDN connection established in the WLAN access network, because the terminal device pre-establishes the second PDN connection in the LTE access network, the terminal device does not need to be registered with the LTE access network again. Therefore, a switching delay is effectively reduced, and occurrence of switching interruption is reduced.

The foregoing mainly describes the solutions provided in the embodiments of this application from a perspective of interaction between network elements. It may be understood that to implement the foregoing functions, each network element, such as the terminal device, includes a corresponding hardware structure and/or software module that is used to perform each function. A person skilled in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that this implementation goes beyond the scope of this application.

In the embodiments of this application, the terminal device may be divided into function modules based on the foregoing method examples. For example, each function module may be obtained through division based on each function, or two or more functions may be integrated in one processing module. The integrated module may be implemented in a form of hardware, or may be implemented in a form of a software function module. It should be noted that, in this embodiment of this application, division into modules is an example, and is merely a logical function division. In actual implementation, another division manner may be used.

Figure 7:
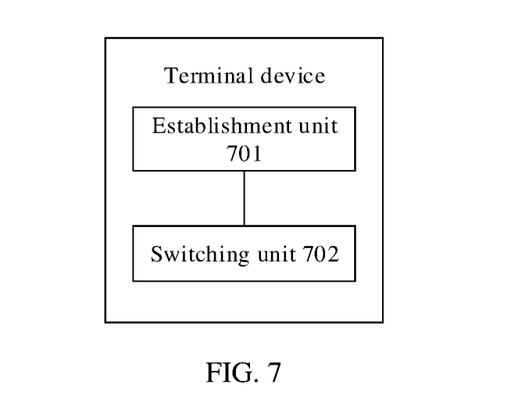
FIG. 7 is a schematic composition diagram of a terminal device according to an embodiment of this application.

When each function module is obtained through division based on each corresponding function, FIG. 7 is a possible schematic diagram of composition of the terminal device used in the foregoing embodiments. As shown in FIG. 7, the terminal device may include an establishment unit 701 and a switching unit 702.

The establishment unit 701 is configured to support the terminal device in performing S301 and S303 in the switching method shown in FIG. 3 and S301$a$, S301$b$, and S303$a$ in the switching method shown in FIG. 4, or in performing S301$a$, S301$b$, S303$b$, and S303$c$, S501 and S502 in the switching method shown in FIG. 5, and S501$a$ and S502 in the switching method shown in FIG. 6.

The switching unit 702 is configured to support the terminal device in performing S302 and S304 in the switching method shown in FIGS. 3, S302 and S304 in the switching method shown in FIGS. 4, S503 and S504 in the switching method shown in FIG. 5, and S501$b$, S503, and S504 in the switching method shown in FIG. 6.

It should be noted that all related content of the steps in the foregoing method embodiments may be cited in function descriptions of corresponding function modules. Details are not described herein.

The terminal device provided in this embodiment of this application is configured to perform the foregoing switching method, and therefore, an effect the same as that of the foregoing switching method may be achieved.

Figure 8:
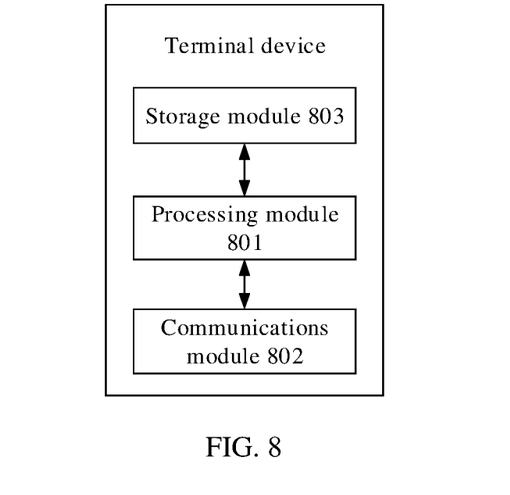
FIG. 8 is a schematic composition diagram of another terminal device according to an embodiment of this application.

When an integrated unit is used, FIG. 8 is another possible schematic diagram of composition of the terminal device in the foregoing embodiments. As shown in FIG. 8, the terminal device includes a processing module 801 and a communications module 802.

The processing module 801 is configured to control and manage an action of the terminal device. For example, the processing module 801 is configured to support the terminal device in performing S301, S302, S303, and S304 in FIG. 3, S301$a$, S301$b$, S302, S303$a$ (or S303$b$ and S303$c$) and S304 in FIG. 4, S501, S502, S503, and S504 in FIG. 5, S501$a$, S501$b$, S502, S503, and S504 in FIG. 6, and/or another process of the technology described in this specification. The communications module 802 is configured to support the terminal device in communicating with another network entity, for example, communicating with a function module or a network entity shown in FIG. 1. Specifically, for example, the communications module 802 is configured to perform S301, S302, S303, and S304 in FIG. 3, S301$a$, S301$b$, S302, S303$a$ (or S303$b$ and S303$c$), and S304 in FIG. 4, S501, S502, S503, and S504 in FIG. 5, and S501$a$, S501$b$, S502, S503, and S504 in FIG. 6. The terminal device may further include a storage module 803, configured to store program code and data of the terminal device.

The processing module 801 may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 802 may be a transceiver, a transceiver circuit, a communications interface, or the like. The storage module 803 may be a memory.

When the processing module 801 is a processor, the communications module 802 is a communications interface, and the storage module 803 is a memory, the terminal device in this embodiment of this application may be the mobile phone shown in FIG. 2.

The foregoing descriptions about implementations allow a person skilled in the art to understand that, for the purpose of convenient and brief description, division into the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A switching method, comprising:
   establishing, by a terminal device, a first packet data network PDN connection in a long term evolution LTE access network;
   switching, by the terminal device, the first PDN connection from the LTE access network to a wireless local area network WLAN access network;
   pre-establishing, by the terminal device, a second PDN connection in the LTE access network, so that the terminal device is in a registered state in the LTE access network, wherein the pre-establishing comprises: after the terminal device switches the first PDN connection from the LTE access network to the WLAN access network, initiating, by the terminal device, a registration process in the LTE access network, and initiating establishment of the second PDN connection in the LTE access network after successful registration by the registration process; and
   when the terminal device is in the registered state in the LTE access network by the pre-establishing of the second PDN connection in the LTE access network, switching, by the terminal device, the first PDN connection or a third PDN connection established in the WLAN access network, to the LTE access network.

2. The method according to claim 1, wherein when the terminal device switches the first PDN connection from the LTE access network to the WLAN access network, the terminal device does not establish any PDN connection in the LTE access network.

3. The method according to claim 1, wherein the establishing, by the terminal device, of the first PDN connection in the LTE access network comprises:
   establishing, by the terminal device, the first PDN connection in a first access network; and
   switching, by the terminal device, the first PDN connection from the first access network to the LTE access network, wherein the first access network is another access network different from the LTE access network.

4. The method according to claim 3, wherein before the switching, by the terminal device, of the first PDN connection from the first access network to the LTE access network, the method further comprises:
   disabling, by the terminal device, a data service in the first access network.

5. The method according to claim 1, wherein the first PDN connection is used for a voice service.

6. The method according to claim 1, wherein
   the first PDN connection is a PDN connection corresponding to an internet protocol multimedia subsystem access point name IMS APN, and the second PDN connection is a PDN connection corresponding to an internet access point name Internet APN; or
   the first PDN connection is a PDN connection corresponding to an Internet APN, and the second PDN connection is a PDN connection corresponding to an IMS APN.

7. The method according to claim 1, wherein
   the terminal device sends a PDN connection request through the LTE access network, the PDN connection request carrying an indication that a request type is handover, to switch the first PDN connection or the third PDN connection established in the WLAN access network to the LTE access network.

8. A non-transitory computer-readable storage medium, comprising instructions, wherein when the instructions are run on a terminal device, the terminal device is configured to provide execution comprising:
   establishing a first packet data network PDN connection in a long term evolution LTE access network;
   switching the first PDN connection from the LTE access network to a wireless local area network WLAN access network;
   pre-establishing a second PDN connection in the LTE access network, so that the terminal device is in a registered state in the LTE access network, wherein the pre-establishing comprises: after the terminal device switches the first PDN connection from the LTE access network to the WLAN access network, initiating, by the terminal device, a registration process in the LTE access network, and initiating establishment of the second PDN connection in the LTE access network after successful registration by the registration process; and when the terminal device is in the registered state in the LITE access network by the pre-establishing of the second PDN connection in the LTE access network, switching the first PDN connection or a third PDN connection established in the WLAN access network, to the LTE access network.

9. The non-transitory storage medium according to claim 8, wherein when the terminal device switches the first PDN connection from the LTE access network to the WLAN access network, the terminal device does not establish any PDN connection in the LTE access network.

10. The non-transitory storage medium according to claim 8, wherein the establishing of the first PDN connection in the LTE access network comprises:
establishing the first PDN connection in a first access network; and
switching the first PDN connection from the first access network to the LTE access network, wherein the first access network is another access network different from the LTE access network.

11. The non-transitory storage medium according to claim 10, wherein before the switching of the first PDN connection from the first access network to the LTE access network, the execution performed by the terminal device further comprises:
disabling a data service in the first access network.

12. The non-transitory storage medium according to claim 8, wherein the first PDN connection is used for a voice service.

13. The non-transitory storage medium according to claim 8, wherein
the first PDN connection is a PDN connection corresponding to an internet protocol multimedia subsystem access point name IMS APN, and the second PDN connection is a PDN connection corresponding to an internet access point name Internet APN; or
the first PDN connection is a PDN connection corresponding to an Internet APN, and the second PDN connection is a PDN connection corresponding to an IMS APN.

14. The non-transitory storage medium according to claim 8, wherein the terminal device is configured to provide execution comprising:
sending a PDN connection request through the LTE access network, the PDN connection request carrying an indication that a request type is handover, to switch the first PDN connection or the third PDN connection established in the WLAN access network to the LTE access network.

15. A device comprising a processor and a memory, wherein the memory is configured to be coupled with the processor and is configured to store a program instructions and data of the device, and the processor is configured to execute the program instructions stored in the memory so that the device is at least configured to:

establish a first packet data network PDN connection in a long term evolution LTE access network;
switch the first PDN connection from the LTE access network to a wireless local area network WLAN access network;
pre-establish a second PDN connection in the LTE access network, so that the device is in a registered state in the LTE access network, wherein to pre-establish the second PDN connection in the LTE access network, the device is further configured to: after the terminal device switches the first PDN connection from the LTE access network to the W LAN access network, initiate, by the terminal device, a registration process in the LTE access network, and initiate establishment of the second PDN connection in the LTE access network after successful registration by the registration process; and
when the terminal device is in the registered state in the LTE access network by the pre-establishment of the second PDN connection in the LTE access network, switch the first PDN connection or a third PDN connection established in the WLAN access network, to the LTE access network.

16. The device according to claim 15, wherein the device is configured such that, when the device switches the first PDN connection from the LTE access network to the WLAN access network, the device does not establish any PDN connection in the LTE access network.

17. The device according to claim 15, wherein to establish the first PDN connection in the LTE access network, the device is further configured to:
establish the first PDN connection in a first access network; and
switch the first PDN connection from the first access network to the LTE access network, wherein the first access network is another access network different from the LTE access network.

18. The device according to claim 17, wherein the device is further configured to, before the switching of the first PDN connection from the first access network to the LTE access network:
disable a data service in the first access network.

19. The device according to claim 15, wherein the first PDN connection is configured for a voice service.

20. The device according to claim 15, wherein
the first PDN connection is a PDN connection corresponding to an internet protocol multimedia subsystem access point name IMS APN, and the second PDN connection is a PDN connection corresponding to an internet access point name Internet APN; or
the first PDN connection is a PDN connection corresponding to an Internet APN, and the second PDN connection is a PDN connection corresponding to an IMS APN.

21. The device according to claim 15, wherein the device is further configured to:
send a PDN connection request through the LTE access network, the PDN connection request carrying an indication that a request type is handover, to switch the first PDN connection or the third PDN connection established in the WLAN access network to the LTE access network.

* * * * *